(12) United States Patent
Higgins et al.

(10) Patent No.: US 11,710,372 B2
(45) Date of Patent: Jul. 25, 2023

(54) MANAGING MOBILE APPLICATIONS IN A GAMING ENVIRONMENT

(71) Applicant: IGT, Las Vegas, NV (US)

(72) Inventors: Kevin Higgins, Reno, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 58 days.

(21) Appl. No.: 16/917,697

(22) Filed: Jun. 30, 2020

(65) Prior Publication Data
US 2020/0402355 A1    Dec. 24, 2020

Related U.S. Application Data

(63) Continuation of application No. 15/852,402, filed on Dec. 22, 2017, now abandoned.

(51) Int. Cl.
*G07F 17/32* (2006.01)
*A63F 13/30* (2014.01)
*A63F 13/73* (2014.01)
*A63F 13/79* (2014.01)

(52) U.S. Cl.
CPC ...... *G07F 17/3227* (2013.01); *G07F 17/3225* (2013.01); *A63F 13/30* (2014.09); *A63F 13/73* (2014.09); *A63F 13/79* (2014.09)

(58) Field of Classification Search
CPC ............. G07F 17/3225; G07F 17/3227; A63F 13/79; A63F 13/70; A63F 13/30
See application file for complete search history.

(56) References Cited

U.S. PATENT DOCUMENTS

| 2008/0318670 | A1* | 12/2008 | Zinder | G07F 17/3251 463/25 |
| 2014/0018155 | A1* | 1/2014 | Nelson | G07F 17/3211 463/25 |
| 2014/0200065 | A1* | 7/2014 | Anderson | G07F 17/3225 463/20 |
| 2016/0093154 | A1* | 3/2016 | Bytnar | G07F 17/3237 463/25 |
| 2019/0192975 | A1 | 6/2019 | Higgins et al. | |

OTHER PUBLICATIONS

Official Action for U.S. Appl. No. 15/852,402, dated Jul. 29, 2019 13 pages.
Official Action for U.S. Appl. No. 15/852,402, dated Feb. 20, 2020 13 pages.

* cited by examiner

*Primary Examiner* — Thomas H Henry
(74) *Attorney, Agent, or Firm* — Sheridan Ross P.C.

(57) ABSTRACT

Technology for managing mobile applications on an electronic gaming machine (EGM) in communication with a mobile device over a communications network is disclosed. An EGM may perform an account login by a user using a gaming host application associated with the EGM such that the account login triggers the gaming host application to launch a selected mobile gaming application for game play on the EGM.

20 Claims, 8 Drawing Sheets

MANAGING MOBILE APPLICATIONS IN A GAMING ENVIRONMENT

BACKGROUND

The present disclosure relates in general to gaming devices and systems, and more particularly to managing mobile applications in a gaming application.

Games of chance have been enjoyed by people for many years and have undergone increased and widespread popularity in recent times. As with most forms of entertainment, some players enjoy playing a single favorite game, while others prefer playing a wide variety of games. In response to the diverse range of player preferences, gaming establishments commonly offer many types of electronic games. Many electronic gaming machines (EGMs), such as slot machines and video poker machines, have been a cornerstone of the gaming industry for several years. The EGMs include specially programmed computers and contain multiple external interfaces. Further, the EGMs may provide mobile services such as funds transferring and game functionality within the gaming establishments to mobile or "player" devices.

BRIEF SUMMARY

Various embodiments for managing mobile applications on an electronic gaming machine (EGM) are provided. The EGM may receive account login information from a mobile device over a communication network and create an account login session using the account login information from the mobile device. In response to the account login session, the EGM may subsequently launch a selected mobile gaming application for game play on either the EGM or mobile device.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Aspects of the present disclosure are illustrated by way of example and are not limited by the accompanying drawings.

DETAILED DESCRIPTION

Figure 1:
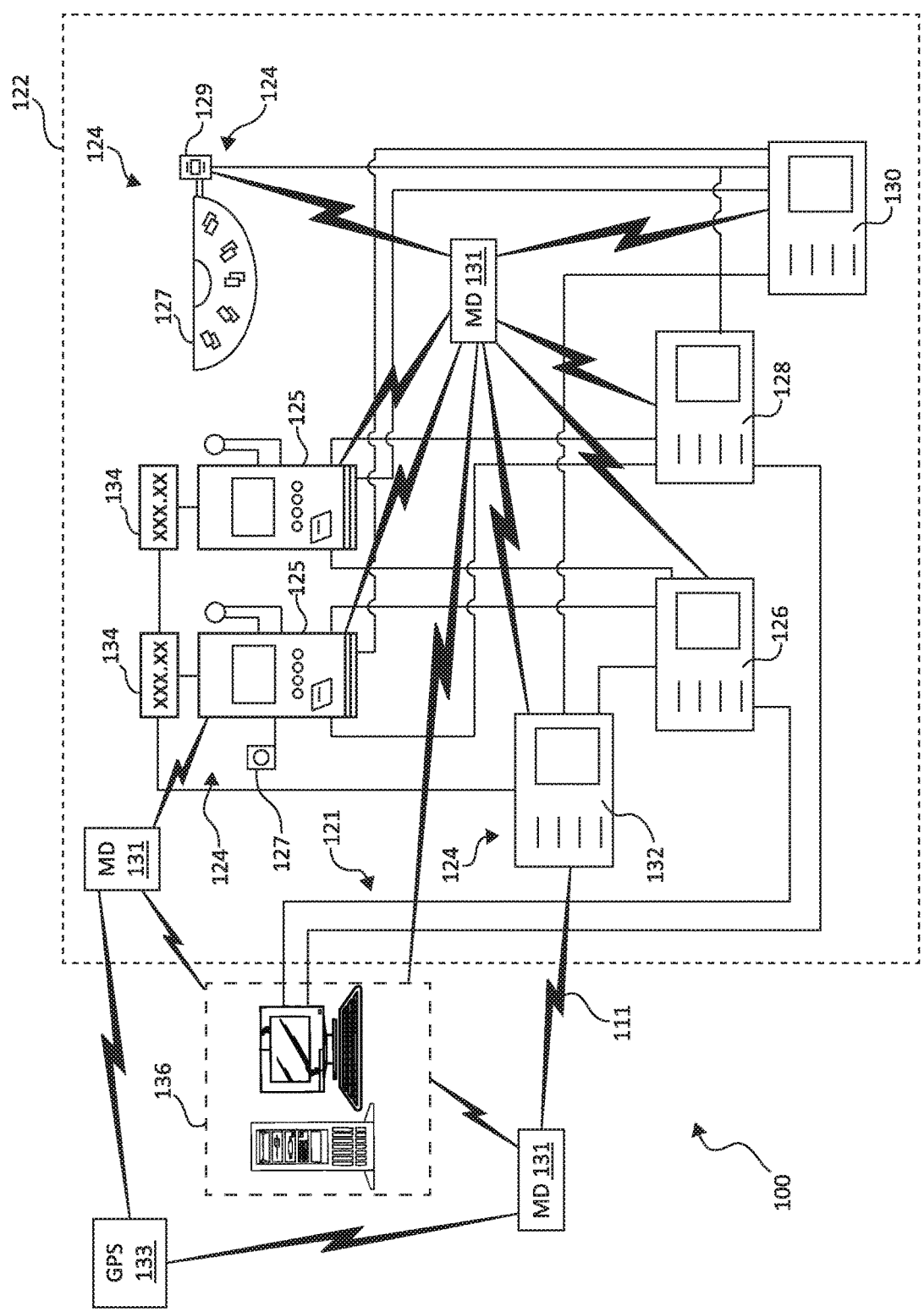
FIG. 1 is a block diagram illustrating a gaming system environment with a gaming terminal data repository (GTDR) connected via one or more network interface(s) to a gaming network which, for example, may include gaming devices (e.g., gaming terminals)

A gaming system (i.e., an EGM) may offer a variety of services or functions such as, for example, functionality for transferring money, providing game play for games of chance, ordering promotions or services, or even an interface for a user to interact with social media. By extension, the EGM may also facilitate providing these and other services or functions to mobile devices used within and/or externally to a gaming establishment in which the EGM is located. When providing this functionality to the user through use of the mobile device, each of the variety of services or functions served by the EGM may require entirely separate or different mobile applications to perform the respective service or function.

More particularly, the user or "player" within (or external to) the gaming establishment (i.e., a gaming venue or casino) may use a first mobile gaming application or "gaming host application" (also referred to herein as simply "mobile application") which is controlled, operated, and managed by the gaming establishment (i.e., a mobile application for use on the mobile device being controlled by a gaming venue or casino). This gaming host application may provide such functionality as managing and/or transferring player funds between the EGM and/or the gaming establishment, and the player's financial institution. For example, when the player desires to transfer funds from their financial institution to a credit account with the gaming establishment, the player may initiate and complete the transfer subsequent to logging into the player's respective gaming establishment account using the gaming host application on the mobile device.

Additionally, the player may use a second mobile gaming application or "selected mobile gaming application" (also referred to herein as simply "game application") which may be controlled, operated, and/or programmed by a third party vendor or the gaming establishment. The selected mobile gaming application may provide to the player functionality such as a game offered for play on a particular EGM. For example, if the player desires to play a game being served by the particular EGM, the player may use the selected mobile gaming application on the mobile device to access and play the game on either the mobile device or the EGM itself. Thus, the second mobile gaming application is referred to herein as the "selected mobile gaming application", as the player selects the second mobile gaming application on the mobile device corresponding to the game of the particular EGM the player is interested in playing.

Notably, the player, subsequent to logging in and performing any desired management functions within the gaming host application, manually switches operation of the mobile device from the gaming host application (or first mobile gaming application) to the selected mobile gaming application (or second mobile gaming application). That is, the player first performs any management or account functions within the gaming host application, exits the gaming host application, and manually chooses the selected mobile gaming application to initiate game play. Because the player's mobile device may have stored multiple different mobile applications from various gaming establishments and third party vendors alike, it may be difficult for the player to choose the correct selected mobile gaming application which corresponds to the game of choice on the particular EGM.

Thus, the present disclosure details embodiments to seamlessly transition from one mobile application (e.g., upon completing account functions within the gaming host application) to an alternative mobile application (e.g., a game within the selected mobile gaming application) on the player's mobile device. In one of the detailed embodiments, an EGM may receive from the mobile device, account login information for a user (i.e., player). The EGM may receive the account login information through one or more communication networks. The EGM may be wirelessly connected to the mobile device and perform an account login for the user using the first mobile gaming application (e.g., the gaming host application) associated with the EGM such that the account login triggers the first gaming application to launch the second mobile gaming application (e.g., the selected mobile gaming application) for game play on the EGM. The first mobile gaming application may be connected to the mobile device through the EGM on a first, wireless and/or wired, communication network, while the second mobile gaming application offered for game play on the EGM may be connected to the mobile device through an alternative wireless communication network (e.g., through a second communication network).

Gaming Systems in a Gaming Environment

By way of background, but not by way of limitation, the following describes a representative computer environment in which the techniques of this disclosure (described below) may be practiced.

Turning now to FIG. 1, a block diagram illustrating a gaming system environment 100 is shown. Environment 100 includes a Gaming Terminal Data Repository (GTDR) connected via one or more network interface(s) to a gaming network which, for example, may include gaming devices (e.g., gaming terminals) and/or other devices, in which aspects of the present disclosure may be realized. As illustrated in FIG. 1, the gaming environment 100 may comprise a gaming system/environment 122 located in a physical environment (not shown). It will be appreciated that the communication links between the various components may be separate and distinct or may be commonly used. It will also be appreciated that one or more of the functions or applications described above may be consolidated, such as at a common server or host. Further, other components for implementing other functionality may be provided. For example, a variety of computing devices, such as user stations, may be connected to the various systems. Printers and other peripheral devices may also be connected to each network or system. A gaming system/environment 122 (e.g., the gaming establishment) may be located at least partially in one or more physical gaming environments, such as a casino, restaurant, and/or convenience store. For example, the casino may include publicly accessible game areas where certain of the gaming system devices 124, such as gaming machines 125 and table games 127 are located, as well as secure areas where the servers and other components are located.

In one embodiment, the physical environment includes at least a portion of a physical structure, such as the gaming establishment or casino, housing one or more components of the gaming system/environment 122. The gaming system/environment 122 includes one or more gaming system devices 124 or components. The gaming system devices 124 may include gaming machines 125, such as those known as video or slot machines. The gaming system devices 124 may also include "table" games 127 such as Blackjack and Roulette. The gaming system devices 124 may also include components or devices such as player tracking card readers 129, coin counters and other gaming device functionality options, which devices or components may be linked or associated with other devices. The devices or components may also comprise computers or servers and communication equipment, cashier and accounting workstations and a wide variety of other elements.

In one embodiment, the gaming system/environment 122 may include a variety of sub-systems. These sub-systems may be partially or fully independent of one another or may be related. In one embodiment, each system may be included or be part of a network. In one embodiment, the gaming system/environment 122 may include a game presentation/operation system, which includes at least one game server 126. The game server 126 may comprise a computing device including a processor and a memory. The game server 126 may be adapted to perform a variety of functions. This functionality may be implemented by software and/or hardware of the server 126. In one embodiment, the game server 126 may be arranged to provide information or instructions to the one or more gaming devices 124 or individual gaming system components. The information may comprise game code and control data. In one embodiment, the game server 126 may also be arranged to accept information from the gaming devices 124 or components. For example, the game server 126 may accept information regarding the status of operation of a particular gaming system device 124 (such as "normal" or "malfunction").

In one embodiment, the game server 126 is part of a network, which includes a communication link between the game server 126 and selected gaming system device(s) 124 and/or other component(s) with which communication is desired. A communication interface may be associated with the game server 126 and each device or component for facilitating the communication. The communication interfaces may have a variety of architectures and utilize a variety of protocols such as IEEE-1394 (FireWire™) or Ethernet in the case where the communication link is a wired link, or a wireless link utilizing a wireless protocol such as WIFI, Bluetooth™, Radio Frequency (RF), Infrared, third generation partnership project (3GPP) long term evolution (LTE), Worldwide interoperability for Microwave Access (WiMAX), High Speed Packet Access (HSPA), etc. The communication links may transmit electrical, electromagnetic or optical signals, which carry digital data streams, or analog signals representing various types of information. In one embodiment, such as when the gaming system device 124 comprises a gaming machine 125, the gaming system device 124 may include a master gaming controller, which controls the functions of game operation. The communication interface may be associated with the master gaming controller, permitting data to be transmitted between the game server 126 and the master gaming controller.

In one embodiment, the gaming system/environment 122 may include a player tracking system, which includes at least one player-tracking server 128. The player-tracking server 128 may also comprise a computing device including a processor and a memory. The player-tracking server 128 may be adapted to perform player-tracking functions. For example, the player-tracking server 128 may store information regarding the identities of players and information regarding the game play of those players. This information may include time of play, coin in/coin out or other monetary transaction data, and in an arrangement where players are awarded points based on play, a player's point total. Once again, the player tracking system includes a network comprising a communication link provided between the player-tracking server 128 and one or more of the gaming system devices 124 having a player-tracking function or other components of the gaming system/environment 122 associated with the system. In one embodiment, such as where the gaming system device 124 comprises a gaming machine, the device may include a management interface board, which controls a card reader. The management interface board may be arranged to receive data from the master gaming controller of the gaming system device 124. A communication interface is associated with the management interface board, permitting data to be transmitted between the player-tracking server 128 and the management interface board.

In the case of table games, a card reader 129 may be associated with the table (e.g., the card reader located on or near the table game). Players may utilize the card reader to identify themselves. Information regarding play of the table game may be input through an input device by a dealer, coin counter or the like, and this information may be transmitted to the player-tracking server 128.

In one embodiment, the gaming system/environment 122 may include an accounting system, which includes at least one accounting server 130. The accounting server 130 may comprise a computing device including a processor and a memory. The accounting server 130 is preferably adapted to perform financial related functions, such as track financial transactions such as bets and payouts, and perform reconciliations with monies collected from the gaming system devices 124, such as gaming machines 125 and table games 127. The accounting server 130 may be associated with a wide variety of devices, including individual gaming system devices 124, mobile devices 131, and other servers. Once again, a communication link may be provided between the accounting server 130 and each device with which communication is desired.

In one embodiment, the gaming system/environment 122 may include a progressive award system, which includes at least one progressive server 132. The progressive server 132 may comprise a computing device including a processor and a memory. The progressive server 132 may be designed to generate progressive award information. In one arrangement, the progressive server 132 may obtain information regarding amounts bet at specific gaming system devices 124, such as gaming machines 125 or table games 127. Utilizing this information, a progressive jackpot award amount may be generated and updated using a specified protocol. The information may be transmitted to one or more displays 134 associated with participating gaming system devices 124. Once again, a communication link is preferably provided between the progressive server 132 and each device with which communication is desired. For example, a link may be provided between the progressive server 132 and accounting server 130 for providing payout information to the accounting server 130. The accounting server 130 also reads the paid amounts from the electronic gaming machines 125 as well and makes sure the paid amounts match what the progressive server claimed the paid amounts should have been. If the paid amounts do not match, then the accounting server 130 may raise a flag for further investigation by casino staff or regulators.

A physical and/or virtual information host 136 is associated with or comprises a portion of the gaming system/environment 122. In one embodiment, the host 136 comprises a computing device, which includes a processor, memory and a display. The virtual information host 136 may be one or more devices separate from devices performing other functions of the system/environment 122, or may be integrated with existing devices. The virtual information host 136 may be designed and adapted to perform functions relating to acquiring, managing, rendering, generating and/or displaying real-time and/or non real-time casino gaming system or "gaming environment" graphical information and information regarding one or more components of the gaming system or environment. Such functionality may also include the generation of at least one graphical user interface on at least one mobile device (e.g., mobile device 131), which is configured or designed to graphically display information (e.g., real-time casino information) relating to selected aspects of casino activity. Also, different graphical user interfaces may be displayed on an external application (e.g., the gaming host application and/or selected mobile gaming application) of a computer, smart phone, and/or on any type of mobile device 131. In one embodiment, bi-directional communication channels 121 are provided for direct, two-way communication between the host 136 and at least one game server 126 and at least one player-tracking server 128, and/or any other device with which communication is desired.

As illustrated in the example of FIG. 1, gaming system/environment 122 may also include one or more of the mobile devices 131 configured or designed to communicate, via one or more wireless links 111, with various components of the gaming environment 100 such as, for example: information systems (e.g., virtual information host 136); player tracking systems; accounting systems; employee management systems; location positioning systems (e.g., GPS system 133); game servers; surveillance systems; security systems; communication systems; gaming systems (e.g., gaming machines 125, game table devices 127, other mobile devices 131, etc.); etc.

Figure 2:
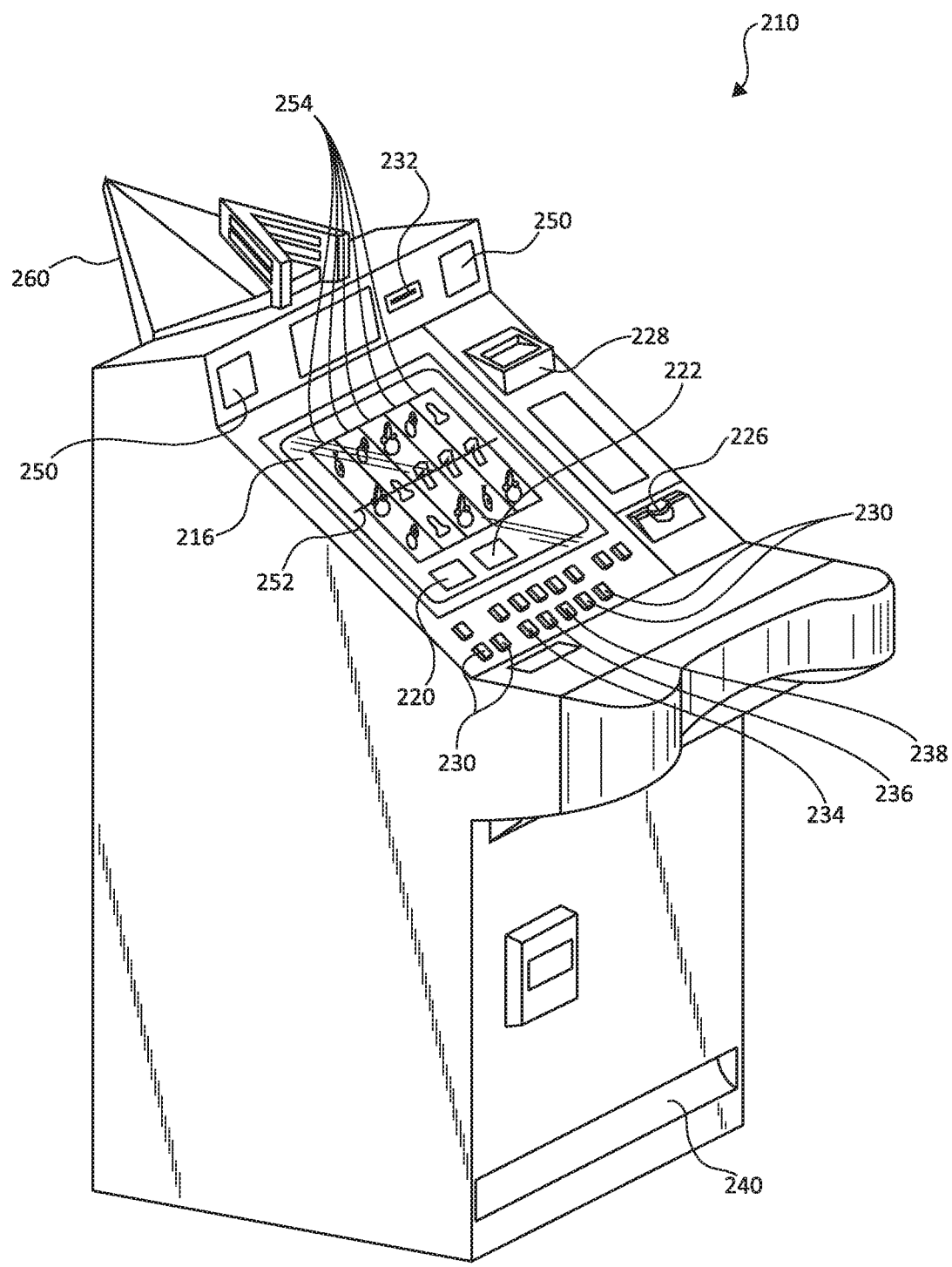
FIG. 2 is a perspective view of one embodiment of a slot machine or gaming device suitable for use in the gaming system of FIG. 1.

FIG. 2 is a perspective view of one embodiment 210 of a slot machine, EGM, or gaming device suitable for use in the previously depicted system of FIG. 1, in which aspects of the present disclosure may be realized. FIG. 2 represents a base gaming device 210 that can be employed in the shared display system or the gaming system of the present disclosure. FIG. 2 illustrates features common to each of the gaming devices. In one embodiment, gaming device 210 has a support structure, housing or cabinet, which provides support for a plurality of displays, inputs, controls and other features of a conventional gaming machine. In the illustrated embodiment, the player plays gaming device 210 while sitting, however, the gaming device is alternatively configured so that a player can operate it while standing or sitting. The illustrated gaming device 210 is positioned on the floor but can be positioned alternatively (i) on a base or stand, (ii) as a pub-style table-top game (e.g., where the participant gaming devices are located remotely from the shared wheel as discussed below), (iii) as a stand-alone gaming device on the floor of a casino with other stand-alone gaming devices, which the player operates while standing or sitting (e.g., where the participant gaming devices are located remotely from the shared wheel as discussed below), or (iv) in any other suitable manner. The gaming device 210 can be constructed with varying cabinet and display configurations. Also, referring to an embodiment for the electronic configuration of gaming device 210, each gaming device may include the components described below.

In one embodiment, each gaming device 210 randomly generates awards and/or other game outcomes based on probability data. That is, each award or other game outcome is associated with a probability and each gaming device generates the award or other game outcome to be provided to the player based on the associated probabilities. Since each gaming device 210 generates outcomes randomly or based upon a probability calculation, there is no certainty that the gaming device 210 will provide the player with any specific award or other game outcome.

In another embodiment, as discussed in more detail below, each gaming device 210 employs a predetermined or finite set or pool of awards, progressive awards, prizes or other game outcomes. As each award or other game outcome is provided to the player, the gaming device 210 removes the provided award or other game outcome from the predetermined set or pool. Once removed from the set or pool, the specific provided award or other game outcome cannot be provided to the player again. The gaming device 210 provides players with all of the available awards or other game outcomes over the course of the play cycle and guarantees a designated amount of actual wins and losses.

Figure 3:
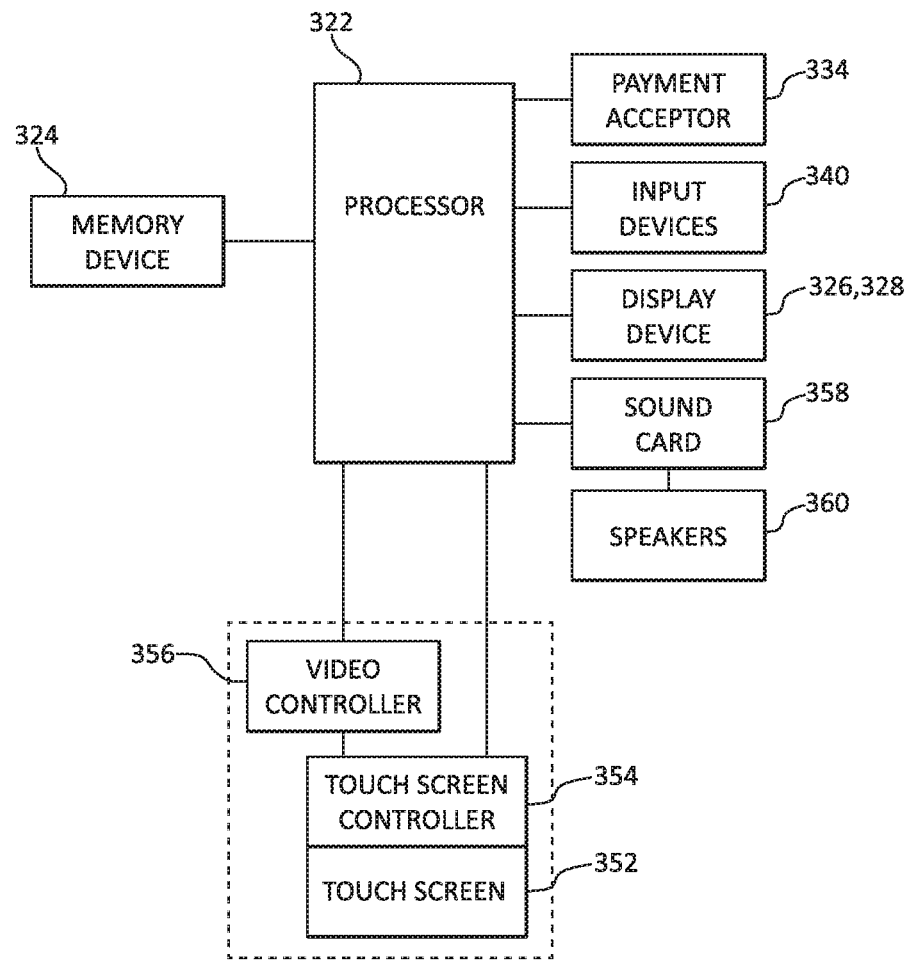
FIG. 3 is a block diagram illustrating an electronic configuration for use in the gaming device of FIG. 2.

As seen in FIG. 2, the gaming device 210 includes a credit display 220 that displays a player's current number of credits, cash, account balance or the equivalent. In one embodiment, gaming device 210 includes a bet display 222 that displays a player's amount wagered. As illustrated in FIG. 3, in one embodiment, each gaming device 210 includes at least one payment acceptor 334 (FIG. 3) that communicates with processor 322 (FIG. 3).

As seen in FIG. 2, the payment acceptor 334 (FIG. 3) in one embodiment includes a coin slot 226, where the player inserts coins or tokens, and a ticket, note or bill acceptor 228, where the player inserts a bar-coded ticket, note, or cash. In one embodiment, a player-tracking card, credit card, debit card or data card reader/validator 232 is also provided for accepting any of those or other types of cards.

In one embodiment, a player inserts an identification card into card reader 232 of gaming device 210. The identification card can be a smart card having a programmed microchip or a magnetic strip coded with a player's identification, credit totals and other relevant information. In one embodiment, money may be transferred to gaming device 210 through an electronic fund transfer and card reader 232 using the player's credit, debit or smart card. When a player funds gaming device 210, processor 322 (FIG. 3) determines the amount of funds entered and the corresponding amount is shown on the credit display or other suitable display as described above. In one embodiment, after appropriate funding of gaming device 210, the player presses a play button 234 or pull arm (not illustrated) to start any primary game or sequence of events. In one embodiment, upon appropriate funding, gaming device 210 begins game play automatically. In another embodiment, the player needs to actuate or activate one of the play buttons to initiate play of gaming device 210.

As shown in FIG. 2, a bet one button 236 is provided. The player places a bet by pushing bet one button 236. The player increases the player's wager by one credit each time the player pushes bet one button 236. When the player pushes the bet one button 236, the number of credits shown in the credit display 220 decreases by one, and the number of credits shown in the bet display 222 increases by one. A max bet max button (not shown) can also be provided, which enables the player to bet the maximum wager (e.g., max lines and max wager per line). Gaming device 210 may include other suitable wager buttons 230, such as a max bet button, a repeat bet button, one or more select paylines buttons and one or more select wager per payline buttons.

In one embodiment, a cash out button 238 is provided. The player presses cash out button 238 and cashes out to receive a cash payment or other suitable form of payment corresponding to the number of remaining credits. The player can receive coins or tokens in a coin payout tray 240 or a ticket or credit slip, which are redeemable by a cashier or funded to the player's electronically recordable identification card. Each gaming device 210 also includes one or a plurality of communication ports for enabling communication of a processor with one or more external peripherals, such as external video sources, expansion buses, expansion games or other displays, an SCSI port, or a key pad.

In one embodiment of FIG. 2, in combination with in FIG. 3, a touch screen 352 (FIG. 3) is provided in one embodiment and operates with a touch screen controller 354, processor 322 (FIG. 3) and display device 326, 328 (FIG. 3). Touch screen 352 (FIG. 3) and the touch screen controller 354 are also connected to a video controller 356. The player touches touch screen 352 at appropriate places to input decisions and signals into processor 322 of gaming device 210. Also, each gaming device 210 may include a sound generating device controlled by one or more sound cards 358, which function in conjunction with processor 322 (FIG. 3). In one embodiment, the sound generating device includes at least one speaker 250 or other sound generating hardware and/or software for generating sounds, such as playing music for the primary and/or secondary game or for other modes of the gaming device, such as an attract mode. In one embodiment, each gaming device 210 provides dynamic sounds coupled with attractive multimedia images displayed on display device 216 to provide an audio-visual representation or to otherwise display full-motion video with sound to attract players to gaming device 210. During idle periods, the gaming device 210 displays a sequence of audio and/or visual attraction messages to attract potential players to gaming device 210. The videos in one embodiment are customized to provide information concerning the shared display of the present disclosure as discussed below.

In one embodiment, gaming device 210 includes a camera in communication with a processor, which is positioned to acquire an image of a player playing gaming device 210 and/or the surrounding area of gaming device 210. In one embodiment, the camera may be configured to selectively acquire still or moving (e.g., video) images and may be configured to acquire the images in either an analog, digital or other suitable format. Display device 216 may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

In one embodiment, as illustrated in FIG. 2, a base or primary game includes a slot game with one or more paylines 252. Paylines 252 may be horizontal, vertical, circular, diagonal, angled or any combination thereof. For a slot game, gaming device 210 displays at least one reel and preferably a plurality of reels 254, such as three to five reels, in either electromechanical form with mechanical rotating reels or in video form with simulated reels and movement thereof. Each reel 254 displays a plurality of indicia such as bells, hearts, fruits, numbers, letters, bars or other images, which preferably correspond to a theme associated with the gaming device. With a slot game, gaming device 210 awards prizes when reels 254 stop spinning and display a winning or paying symbol or combination of symbols on an active payline 252.

In one embodiment, each gaming device 210 includes indicators 260. Indicators 260 reside on the top of each gaming device 210 and point to or indicate one of the awards or outcomes on top of a shared display (not shown) when the shared display stops spinning to reveal randomly or otherwise generated results or outcomes. Indicators 260 may illuminate differently at different times or states for the gaming device 210. The illumination of the indicator 260 in one embodiment depends upon whether the gaming device 210 is playing a base game, is in a state in which the player is eligible to play the shared display bonus, is in a state in which the player has committed to play the shared display bonus or is in a state in which the player has declined to play a particular upcoming shared display bonus, as well as other states discussed below.

It should be noted that all of aforementioned functionality of gaming device 210 may be provided, or served, by the gaming device 210 to the one or more mobile devices 131 through the one or more communications networks, and thereby presented for display on the one or more mobile devices 131. To wit, the bet one button 236, credit display 220, bet display 222, wager buttons 230, reels 254, etc. may be implemented as "buttons" or "windows" in an interactive graphical user interface (GUI) through one or more applications (e.g., the gaming host application and/or the selected mobile gaming application) executing on the one or more mobile devices 131, where the one or more applications are processed through to the one or more mobile devices 131 by the gaming device 210.

FIG. 3 is a block diagram illustrating an electronic configuration for use in the gaming device of FIG. 2, here again in which aspects of the present disclosure may be realized. In the embodiment illustrated in FIG. 3, the player station may include at least one processor 322, such as a microprocessor, a microcontroller-based platform, a suitable integrated circuit or one or more ASICs. The processor 322 is in communication with or operable to access or to exchange signals with at least one data storage or memory device 324. In one embodiment, the processor 322 and the memory device 324 reside within the cabinet of the player station. The memory device 324 stores program code and instructions, executable by the processor 322, to control the player station. The memory device 324 also stores other data such as image data, event data, player input data, random or pseudo-random number generators, pay-table data or information and applicable game rules that relate to the play of the player station. In one embodiment, the memory device 324 includes random access memory (RAM), which can include non-volatile RAM (NVRAM), magnetic RAM (MRAM), ferroelectric RAM (FeRAM) and other forms as commonly understood in the gaming industry. In one embodiment, the memory device 324 includes read only memory (ROM). In one embodiment, the memory device 324 includes flash memory and/or EEPROM. Any other suitable magnetic, optical and/or semiconductor memory may operate in conjunction with the player station and gaming system disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming system is operable over a wireless network, such as part of a wireless gaming system. In this embodiment, the player station may be a handheld device, a mobile device or any other suitable wireless device that enables a player to play any suitable game at a variety of different locations. It should be appreciated that a player station as disclosed herein may be a device (e.g., the EGM) that has obtained approval from a regulatory gaming commission or a device that has not obtained approval from a regulatory gaming commission. It should be appreciated that the processor and memory device may be collectively referred to herein as a "computer" or "controller."

In one embodiment, a background play feature may be available where a player, who may be sitting at the lounge and/or at the bar with friends (at the casino) may be playing a machine from the floor by remote via the external application(s) (e.g., via the one or more mobile devices 131). The player may substitute into the same game he wanted from a Gaming Vendor online game and play, or backend the actual game though a venue network. The game may be bankrolled by the venue the player was inside. If the player was to win the player could collect from that venue where the player was located, and/or instead of "reserving" a machine he could continue the game with an auto play during a period of time the player took a break/recess. In one embodiment, a team game may be played by a group of players (e.g., a group of 3 or 4 players) and the group of players may watch and/or play the same game on each player's individual mobile device (e.g., a computer, tablet, and/or smart phone). Similarly, as described above, the team game may be played by a group of players from a remote location (e.g., bar, lounge, casino, home, office, restaurant, etc.). In one embodiment, the team game may be played by a group of players and the group of players may share credit inputs and wins. In one embodiment, the team game may be played by the group of players and the group of players may sell off and/or share double up options and/or credits to other team players of the group.

In one embodiment, as mentioned above and seen in FIG. 3, one input device is a touch screen 352 coupled with a touch screen controller 354, or some other touch-sensitive display overlay to allow for player interaction with the images on the display. The touch screen and the touch screen controller are connected to a video controller 356. A player can make decisions and input signals into the player station by touching the touch screen at the appropriate places. One such input device is a conventional touch screen button panel. In another embodiment, a plurality or each of the display segments is a touch screen 352 coupled with a touch screen controller 354 or some other touch-sensitive display overlay to allow for player interaction with the images on the display segments. The touch screens 352 and the touch screen controllers 354 are connected to a video controller. The player station may further include a plurality of communication ports for enabling communication of the processor with external peripherals, such as external video sources, expansion buses, game or other displays, an SCSI port, or a key pad. In one embodiment, at least one payment acceptor 334 (which may communicate with processor 322 for playing a bet) input devices 340, and display devices 326, 328 are provided.

The player stations, the central controller and the display segments may include serial interfaces and/or Ethernet (e.g., G2S (game-to-system) protocol uses commodity Ethernet equipment and TCP/IP) to connect to specific subsystems or subnets internal and external to the player stations, central controller and the display segments. The serial devices may have electrical interface requirements that differ from the "standard" EIA serial interfaces provided by general-purpose computers. These interfaces may include EIA, EIA, Fiber Optic Serial, optically coupled serial interfaces, current loop style serial interfaces, etc. In addition, to conserve serial interfaces internally in the player station, serial devices may be connected in a shared, daisy-chain fashion where multiple peripheral devices are connected to a single serial channel.

The serial interfaces and/or Ethernet (e.g., G2S (game-to-system) protocol uses commodity Ethernet equipment and TCP/IP) may be used to transmit information using communication protocols that are unique to the gaming industry. For example, SAS is a communication protocol used to transmit information, such as metering information, from a player station to a remote device. Often SAS is used in conjunction with a player tracking system. EGMs may be treated as peripheral devices to a casino communication controller and connected in a shared daisy chain fashion to a single serial interface and/or Ethernet. In both cases, the peripheral devices are preferably assigned device addresses. If so, the serial controller circuitry must implement a method to generate or detect unique device addresses. In one embodiment, security-monitoring circuits detect intrusion into a player station or gaming station by monitoring security switches attached to access doors in a designated area, such as a player station cabinet. In one embodiment, access violations result in suspension of game play and can trigger additional security operations to preserve the current state of game play. These circuits also function when power is off by use of a battery backup. In one embodiment, as seen in FIG. 3, the player station includes a sound generating device controlled by one or more sound cards 358 which function in conjunction with the processor. In one embodiment, the sound generating device includes at least one and preferably a plurality of speakers 360, which may be part of a distributed speaker system, or other sound generating hardware and/or software for generating sounds, such as playing music for the primary and/or secondary game or for other modes of the player station, such as an attract mode. In one embodiment, the player station provides dynamic sounds coupled with attractive multimedia images displayed on one or more of the display devices to provide an audio-visual representation or to otherwise display full-motion video with sound to attract players to the player station. During idle periods, the player station may display a sequence of audio and/or visual attraction messages to attract potential players to the player station. The videos may also be customized for or to provide any appropriate information.

In one embodiment, the gaming system may include a sensor, such as a camera in communication with the processor (and possibly controlled by the processor) that is selectively positioned to acquire an image of a player actively using the player station and/or the surrounding area of the player station. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia. In another embodiment, the gaming system includes a wireless transceiver or a camcorder and the display segments are components of or are connected to televisions, satellites, DVD players, digital video recorders and Internet-enabled devices. In one embodiment, the game may be displayed on the central display and replicated on one or more the player stations. In another embodiment, the game is only displayed on the central display and the player station is only used to input decisions or commands in the game. In another embodiment, a primary or base game is displayed on the player station and/or the central display and one or more bonus games are displayed on the central display only. In one embodiment, the player stations provide other information to a player, such as the win/loss history of that certain games or the win/loss history of that player. It should be appreciated that the central display and the player stations may work together with a central controller or a plurality of servers to provide the games to the player in any suitable manner.

Managing Mobile Applications in the Gaming Environment

Figure 4:
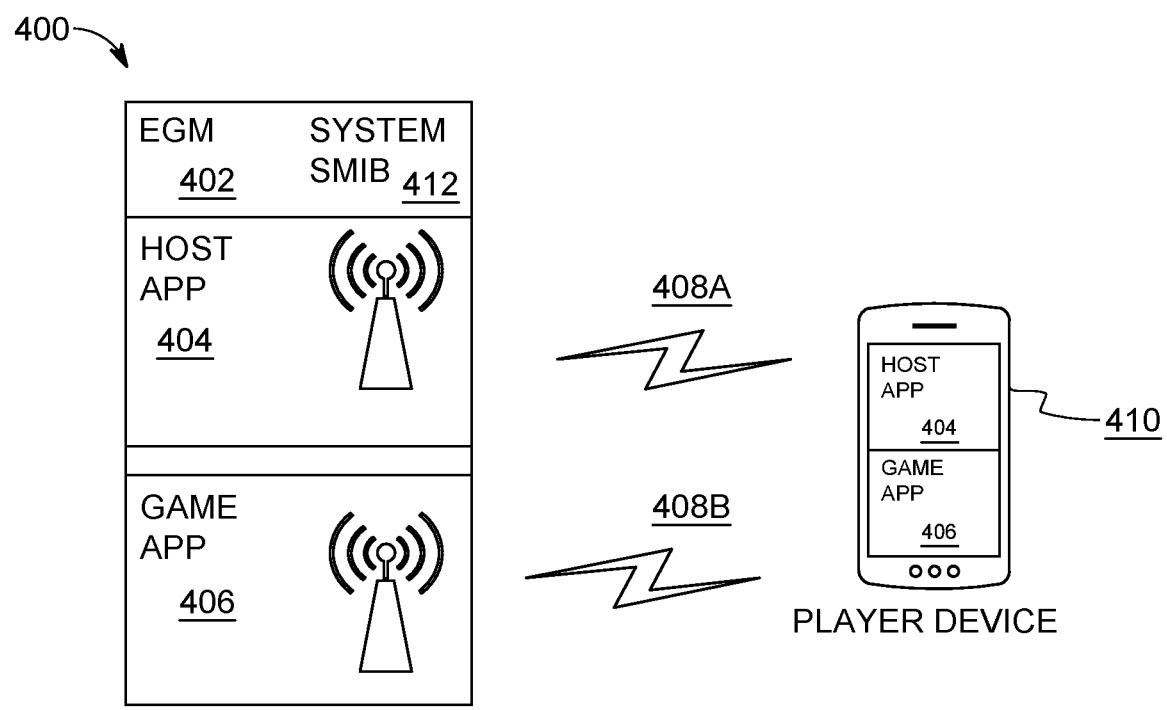
FIG. 4 is a block diagram illustrating an electronic gaming machine (EGM) having at least two wireless connections with a mobile device.

Having described one or more gaming establishments and/or EGM architectures, turning now to FIG. 4, a block diagram is depicted illustrating an exemplary gaming system 400. The gaming system may include an EGM 402 having at least two wired and/or wireless connections, such as wireless connections 408A, 408B, through which a mobile device (or "player device") 410 connects thereto. The EGM 402 may include one or more mobile applications such as, for example, mobile application 404 (e.g., the gaming host application) and game application 406 (e.g., the selected mobile gaming application). The EGM 402 may use the wireless connections 408A, 408B via a system slot machine interface board (SMIB) 412 to facilitate providing mobile application 404 and game application 406 to the mobile device 410 through which a user may interact with the EGM 402.

Consider, for illustration purposes, that the EGM 402 may itself provide, or facilitate providing to the mobile device 410, at least two mobile services: a money transfer service and game play functionality. The money transfer service may enable a player to cash-in and cash-out using the mobile device 410 and a mobile application, such as, mobile application 404 (e.g., the gaming host application). In other words, a player may, in some embodiments, use the mobile device 410 and the EGM 402 interchangeably such that accounting functions (e.g., login and money transfer functionality) may, for example, be performed on the mobile application 404 of the mobile device 410, and subsequently the player may then initiate the game application 406 on either the mobile device 410 or on the EGM 402 itself, and vice versa. In one aspect, the mobile application 404 may be associated with and/or include the SMIB 412 such that the mobile application 404 may be operated on or by the SMIB 412 and connected to the mobile device 410 via a wired and/or wireless connection, such as wireless connection 408A and/or 408B. The mobile application 404 may be branded or associated with a gaming host (e.g., a casino or gaming establishment), identifying a specific property, brand, or slogan. An example of this branding may be found in the gaming host application entitled "MGM® M-Life®", which is operated and maintained by the MGM Resorts International™ Corporation. Gaming establishments, such as the aforementioned, may brand the gaming host application in an effort to distinguish their mobile application as genuine and secure, particularly since the gaming establishment may manage funds transferred to and from their respective property application (e.g., mobile application 404 or "gaming host application"). Again, the mobile application 404 may communicate with the EGM 402 SMIB 412 or an alternative communications module within the EGM 402 via the wired and/or wireless connections 408A, 408B of which may comprise communication protocols such as WIFI, Bluetooth™, Radio Frequency (RF), Infrared, third generation partnership project (3GPP) long term evolution (LTE), Worldwide interoperability for Microwave Access (WiMAX), High Speed Packet Access (HSPA), or other wireless communication standards.

The game functionality of the EGM 402 may enable a player to perform one or more actions, such as screen captures, game plays, interaction with game elements, or a combination thereof. Thus, the game application 406 (e.g., the selected mobile gaming application) may communicate with the EGM 402 game electronics via a wired and/or wireless connection interface, such as wireless connection 408B or, alternatively, wireless connection 408A. The game application 406 may be released by a third party game manufacturer independent of the gaming establishment, which may provide separate instances of the game application 406 as a distinct application for each particular released game and/or group of games.

More specifically, the game application 406 may be provided by a game manufacturer separately from the mobile application 404 (the gaming host application). Each released iteration may include a new game application, or update thereto, to enable one or more game features. For example, a driving game may be released by the game manufacturer that enables a player to use the mobile device 410 and the game application 406 to operate a vehicle within the game by player input of the mobile device 410. Another example may include a separate instance of the game application 406 that enables a player to control pinball flippers by player input of the mobile device 410 during play of a pinball game. Hence, the player may have multiple mobile applications (multiple instances of game application 406) on the mobile device 410 to facilitate play of each one of a plurality of games, each having a unique variety of features.

In the provided example/scenario of FIG. 4, the player/user (not depicted) may encounter an undesirable workflow since the player may be required to manually switch between the multiple applications of the mobile device 410 to use the various gaming features. This generally requires the player to know the names of all possible applications (of the multiple mobile applications) that may be compatible with the EGM 402 they are using, since each instance of the game application 406 may only be compatible with a single game or theme.

Hence, the various embodiments provided herein facilitate this workflow by first presenting the player the opportunity to perform monetary or account functions (e.g., account login operations) via the mobile application 404 (e.g., the branded property or gaming host application). More particularly, the player first opens the mobile application 404 on the mobile device 410, which may be branded to the gaming establishment property, where the player may be presented with a GUI providing an initial screen such as an account login screen. The player may enter login credentials associated with the gaming establishment (e.g., the casino) which have been established either previously and/or at the time of first opening the mobile application 404.

Once the player has been authorized by input of the player login credentials (which are confirmed through the EGM 402 via a connection such as wireless connection 408A, 408B), the player may then be automatically transferred to an interface such as an account "home" screen, through which the player may then complete the desired monetary or account functions associated with the player's account with the gaming establishment. The monetary or account functions may include performing a cash-in cash-out operation, establishing a transferring of the winnings, funding a bet associated with game play, establishing a credit balance to fund the bet associated with the game play, changing and/or resetting one or more of the login credentials of the user/player, providing player loyalty account information, or a combination thereof.

Subsequent to performing the monetary or account functions, the mobile application 404 may automatically transfer the player to the game application 406 (e.g., the selected mobile gaming application). In other words, the mobile application 404 may automatically launch the appropriate game application, such as game application 406, for the particular EGM 402 in which the player is physically situated. In another embodiment, for a player external to the gaming establishment (or otherwise remotely located to the EGM 402), an instance of the game application 406, which may have been previously played by the player in a previous gaming session, may be automatically launched. In still another embodiment, the mobile application 404 may provide a GUI "button" or selector to the player on a display of the mobile device 410 which, when depressed, initiates the appropriate instance of the game application 406 for the local or remotely located EGM 402 of which the player desires to play. To wit, the mobile application 404 may provide a "hybrid" approach where the player manually depresses the GUI selector on the mobile device 410 to be taken to the appropriate instance of the game application 406 while determining which mobile application the appropriate instance is, and automatically transferring the player to the appropriate instance of the game application 406 in response to the player depressing the GUI selector within the mobile application 404.

Figure 5:
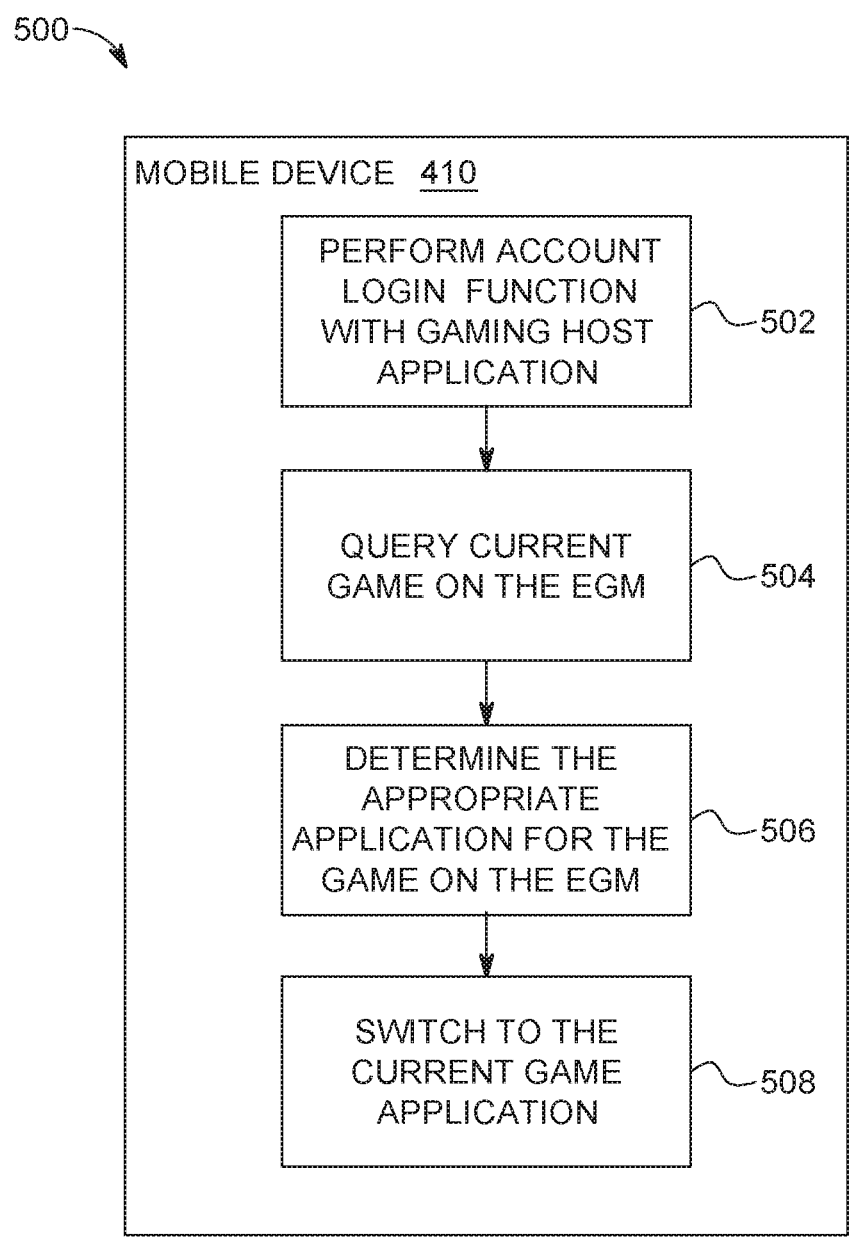
FIG. 5 is a flowchart illustrating an exemplary method for automatically switching from a gaming host application to a mobile gaming application, via a mobile device, on an electronic gaming machine (EGM)

FIG. 5 is a flowchart illustrating an exemplary method 500 for automatically switching from the mobile application 404 (e.g., the gaming host application) to the game application 406 (e.g., the selected mobile gaming application) on mobile device 410 via EGM 402. That is, the method 500 depicts exemplary steps of a login process to the player's gaming establishment account using the mobile application 404, wherein the mobile device 410 automatically switches to an appropriate instance of the game application 406 being served by the EGM 402 subsequent to the login process. The method 500 may be implemented in various environments described in FIGS. 1-4.

In operation, the method 500 may include one or more of the following actions. An account login function or association may be performed on the mobile device 410 using a GUI interface provided by the mobile application 404, as in block 502. It should be noted that any monetary or account function associated with the mobile application 404 may comprise the account login operation. For example, the account login function may be a cash-in and/or cash-out operation, a player account login operation, or an enablement of an achieved bonus feature/operation (e.g., an extra credit or bonus game). Again, the player may first open or "launch" the mobile application 404 on the mobile device 410 where the player may be presented with a GUI providing an initial screen such as an account login screen. The player may enter login credentials associated with the gaming establishment (e.g., the casino) which have been established either previously and/or at the time of first opening the mobile application 404. Alternatively, the player may have previously entered login credentials and may desire to perform an additional account login or monetary function, such as the aforementioned cash-in and/or cash-out operation or enablement of an achieved bonus feature/operation.

Subsequent to the account login function, a query operation may be performed by the mobile device 410 on the EGM 402 through communications networks 408A and/or 408B to identify a current game for play (or a most recent game for play) being provided or served by the EGM 402, as in block 504. The appropriate game application 406 (the current game being provided or served by EGM 402) may be determined and/or identified for executing the game on the mobile device 410, as in block 506. Alternatively to querying the EGM 402 by the mobile device 410, the EGM 402 may identify the current game for play and asynchronously notify the mobile device 410. A switching operation may then be performed to immediately switch from the mobile application 404 to the (automatically launched) appropriate instance of the game application 406 on the mobile device 410, as in block 508. This switching operation may be performed on the mobile device 410 automatically and immediately following a completion of one or more of the account login functions. Alternatively, the GUI of the mobile application 404 may provide an interface button, tab, or the like, to transfer the player from the mobile application 404 to the game application 406 upon the player physically depressing the selected button or tab option.

In additional embodiments, subsequent to the account login function, when a player changes from the current game for play to an alternative game on the mobile device 410, the mobile device 410 may notify the EGM 402, and the EGM 402 may perform a switching operation to the appropriate game application 406, if the requested game is present on the EGM 402. That is, when the player is playing a certain game application 406 on the mobile device 410 (which is being served by the EGM 402), and the player then changes to an alternative game application 406 on the mobile device 410, the EGM 402 may then determine whether the alternative game application 406 is installed and available to be served by the EGM 402 to the mobile device 410, and begin serving the alternative game application 406 to the mobile device 410. Moreover, the inverse of this situation may also be performed. In other words, when the player changes a game selection of the game application 406 on the EGM 402, the EGM 402 may perform a switching operation to begin game play of the selected game application 406, and begin serving this selected game application 406 (and thereby automatically switching the selected game application 406) to the mobile device 410 (assuming the selected game application 406 is installed or available for play on the mobile device 410—if not, the mobile device 410 may install the selected game application 406 from an application store as will be described, following).

With the foregoing functional components of FIGS. 1-5 in view, consider the following examples and scenarios. Upon logging into the mobile application 406 on the mobile device 410, the player may choose to fund a selected amount of money or apply a credit to a credit meter. This "cash-in" operation serves as the account login function which triggers the identification of the current game application 406 being offered by the particular EGM 402 the player is either physically situated at or desires to play. The player is then automatically transferred to the appropriate (currently served) game application 406 (which is launched) from the mobile application 404 for game play on either the EGM 402 and/or the mobile device 410. Alternatively and as aforementioned, a selection option through the GUI of the mobile application 404 may be provided to transfer the player from the mobile application 404 to the game application 406 such that the player may complete several account login functions prior to proceeding to the game application 406 upon the player depressing the selected option.

In still further embodiments, a timer may be presented to the player such that, upon completion of one of the account login functions, the player is automatically transferred from the mobile application 404 to the game application 406 upon the timer expiring. For example, the player may complete the cash-in operation as referred to above, at which point the GUI of the mobile application 404 presents a timer of a predetermined time (e.g., 10 seconds), where upon expiration of the timer, the player is then automatically transferred from the mobile application 404 to the game application 406. The timer may reset upon the player performing an additional account login function, or the player may alternatively cancel the timer by depressing a GUI selection option and remain in the mobile application 404. Still further, the player may forfeit the remaining time by depressing an additional GUI selection option to be directly transferred to the game application 406.

In some cases, the player may not have installed the correct mobile application for the appropriate instance of the game application 406 on the mobile device 410. In this case, the mobile application 404 of the mobile device 410 may communicate with the EGM 402 to detect the absence of the correct mobile application on the mobile device 410 for current game play (a current game being provided or served) by the EGM 402. The appropriate instance of the game application 406 may be preloaded or installed on the EGM 402 such that the EGM 402 provides the appropriate instance of the game application 406 to the mobile device 410 upon detecting the absence. That is, if the player's mobile device 410 does not have stored the correct application for the appropriate instance of the game application 406 which is currently offered for play by the EGM 402, the mobile device 410 may download the appropriate instance of the game application 406 from the EGM 402 and install such automatically on the mobile device 410. Alternatively, the mobile application 404 of the gaming establishment may direct and transfer the player of the mobile device 410 to an application center or application store to enable the mobile device 410 to install the appropriate instance of the game application 406 on the player's mobile device 410.

In some embodiments, the player may be located at the EGM 402 and playing the game application 406, and desire to switch from the game application 406 to the mobile application 404. In other words, the player may be playing the selected mobile gaming application and desire to switch back to the gaming host application associated with the gaming establishment property. Therefore, in one aspect, the embodiments enable the game application 406 (which, again, may be provided by a third party vendor) to identify the gaming establishment's application (the mobile application 404), and seamlessly switch from the game application 406 to the (correct) mobile application 404 of the gaming establishment the player is located within, as depicted in FIG. 6A.

Figure 6A:
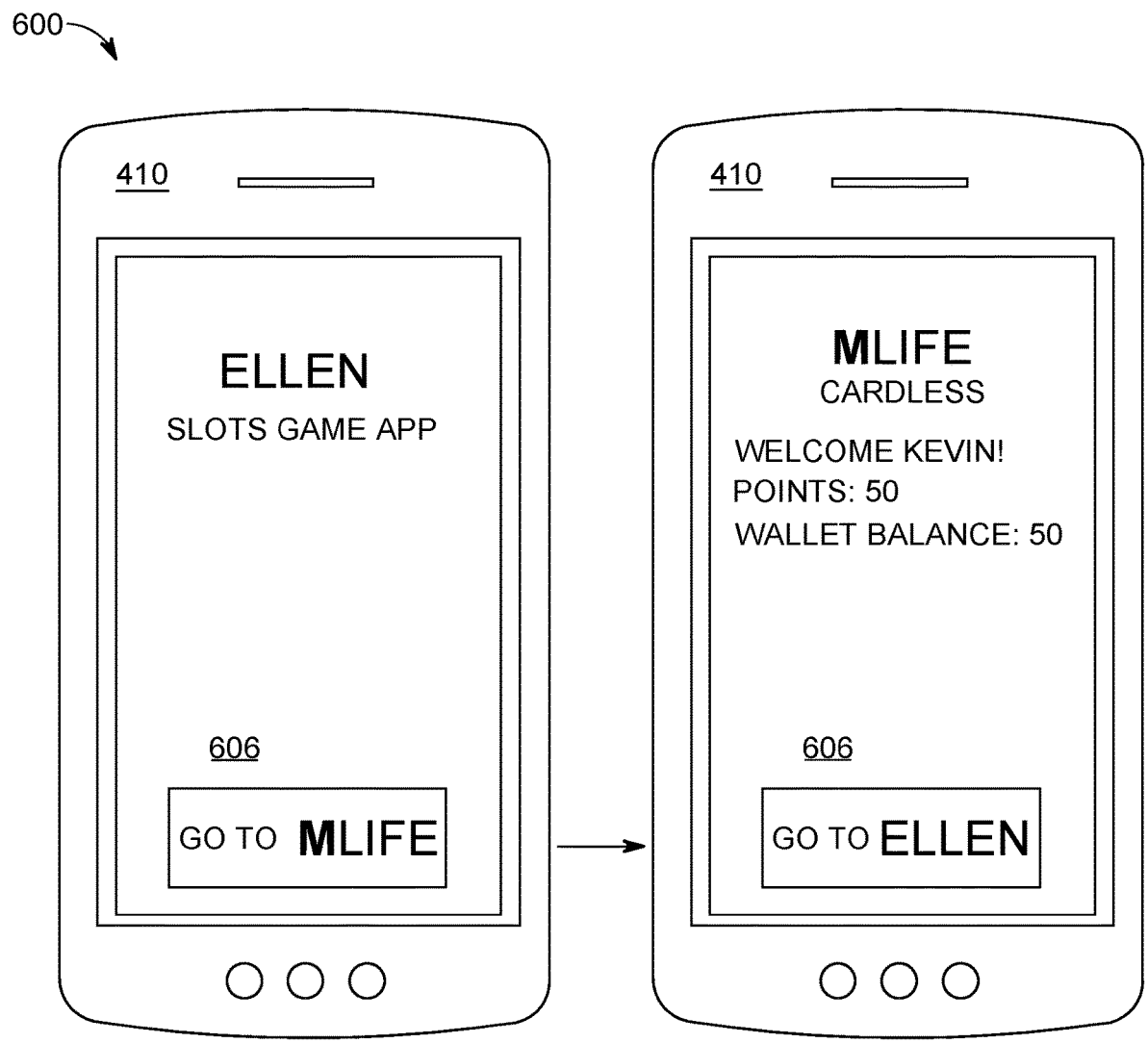
FIG. 6A is a block diagram illustrating an electronic gaming machine (EGM) automatically switching from a mobile gaming application to a gaming host application.

FIG. 6A depicts a block diagram 600 illustrating the mobile device 410 which automatically switches from the game application 406 (the selected mobile gaming application) to the mobile application 404 (the gaming host application). Of note, mobile device 410 is depicted for convenience in the block diagram 600, however, the mobile device 410 may additionally and/or alternatively comprise the EGM 402 itself. The game application 406 executing on the mobile device 410 may provide an interactive GUI button

606 (e.g., a selection button) within the game application 406 to transfer and switch back the mobile device 410 to the mobile application 404.

For example, the player may be playing an instance of the game application 406 entitled "Ellen" on the mobile device 410, and desire to switch back to the gaming establishment's mobile application 404 (e.g., the MGM® M-Life® mobile application). The player may select the GUI button 606 ("Go to MLife") on the mobile device 410 such that the game application 406 is either exited or paused, and the mobile application 404 is initiated or brought into view. The mobile application 404 may depict the player's account information (e.g., Name: "Kevin", Amount of player points: "50", Wallet/credit balance: "50", and the like). Upon switching from the game application 406 to the mobile application 404, the GUI button 606 (or other type of selector) may be changed to indicate and facilitate the mobile device 410 to switch back to the game application 406 (e.g., using a selector indicator depicting "Go to Ellen") upon depression of the selector on the GUI of the mobile device 410, by the player.

Figure 6B:
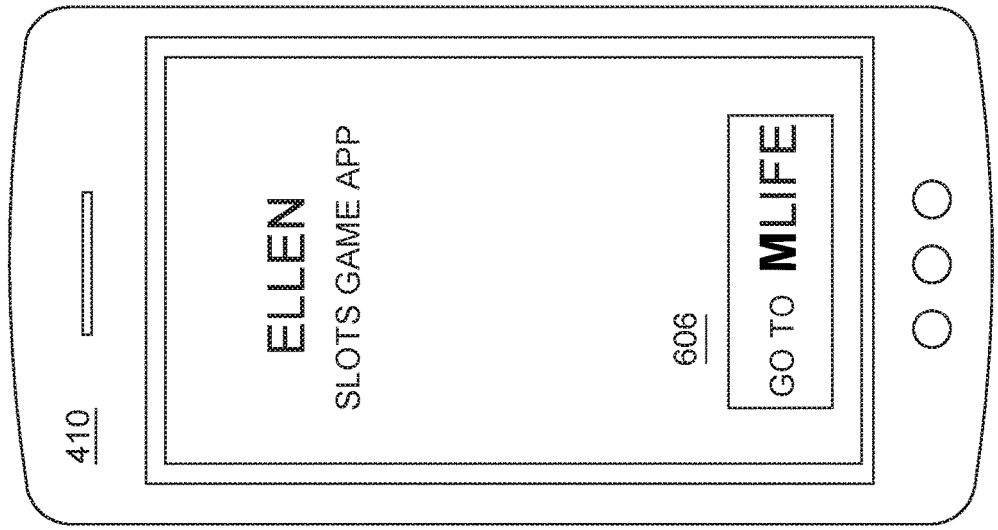
FIG. 6B is a block diagram illustrating an electronic gaming machine (EGM) providing collected information about a user to a mobile gaming application.
Figure 6B:
Figure 6B:

Turning now to FIG. 6B, a block diagram 625 of a system for collecting and transferring player information between the EGM 402 and the mobile device 410 is depicted. It should be noted that the context of which instance of the mobile application 404 (the gaming host application) that the mobile device 410/EGM 402 switches to may be determined based upon numerous factors, including, but not limited to, whether the gaming establishment's application (mobile application 404) launched the game application 406, and/or the geolocation of the EGM 402 or mobile device 410. Additionally, there may be scenarios where the game application 406 may need to know information about the particular player in order to offer the player one or more unique features which are specifically targeted for the individual player.

For example, the EGM 402's game application 406 executing on the mobile device 410 may allow the player to save state data, such as data indicating the player earned a selected number of credits or winnings during game play of the game application 406. In order to save the state data, the mobile application 404 may be enabled to learn identity and other selected information pertaining to the player playing the game application 406.

In one aspect, the EGM 402's game application 406 may be integrated with the gaming establishment's Casino Management System (CMS) to learn the selected identity information about the player of the particular game. Accordingly, as indicated in FIG. 6B, the game application 406 (i.e., the current or selected mobile gaming application being provided or served by the EGM 402) may be enabled to learn about the identity and selected information pertaining to the player directly from the gaming establishment's mobile application 404, so as to provide the EGM 402 manufacturer an integration point to collect details about the player and/or the game play thereof. This identifying information may include a player name (or nickname), a player ID (e.g., an alphanumeric sequence), a signature (e.g., using a private signature key), and the aforementioned account information associated therewith.

For example, this integration may include passing one or more messages in a background process between two mobile applications (e.g., the mobile application 404 and the game application 406). The messages may include identifying information associated with the player, identifying the player's authentication state (e.g., whether the player has input a PIN associated with their account login, and whether the PIN has or has not been authenticated), or providing a variety of alternative analytic data. The game application 406 may also send requests to the mobile application 404, such as a request to authenticate the player (PIN validation if no PIN has been input by the player).

All information transferred or passed to and from the mobile application 404 may be cryptographically signed such that the game application 406 may validate that the player has been transferred directly from the gaming establishment's mobile application 404 and/or the operator's CMS. Finally, the gaming establishment's mobile application 404 may even restrict which instances of the game application 406 are allowed to integrate with the mobile application 404 by requiring each game application 406 to include an application programming interface ("API") key with each data request. In other words, information shared between the mobile applications may be encrypted in order to ensure that only authorized mobile applications may engage in the exchange of data, including the player identification and analytic information.

For example, the game application 406 (for the game entitled "Ellen") may be automatically launched for the player identified as "Kevin" if the message identifies that certain criteria are met (e.g., the player is identified as "Kevin" having player identification number "1234", authorizations set as "true", and the signature 0x0033747575).

It should be noted that, when launching the game application 406 (the selected mobile gaming application) by the mobile application 404 (the gaming host application), the identity and analytic information associated with the player may additionally be included (e.g., through an inter-application message) in the game application 406 during the launching operation of the game application 406 for game play on either the mobile device 410 and/or EGM 402.

Figure 7:
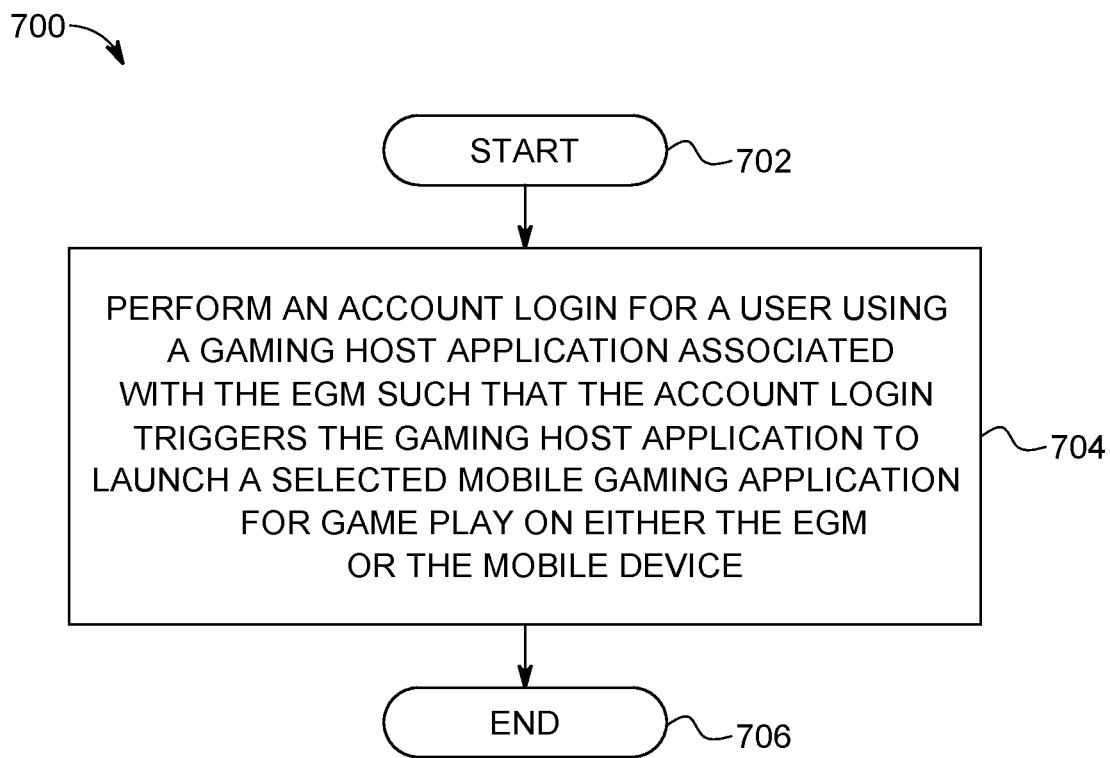
FIG. 7 is a flowchart illustrating an additional exemplary method for managing mobile applications in a gaming application in a gaming environment.

FIG. 7 is a flowchart illustrating an additional exemplary method for managing mobile applications on the mobile device 410 being in communication with the EGM 402 through one or more communication networks 408A, 408B. The functionality of the method 700 may be implemented in various environments as described in FIGS. 1-6A-B.

The functionality 700 may start in block 702. The mobile device 410 may, through communication with the EGM 402, perform an account login function by the player/user using the mobile application 404 (the gaming host application) associated with the EGM 402 such that the account login function triggers the mobile application 404 to launch the game application 406 (the selected mobile gaming application) for game play on the EGM 402 or the mobile device 410, as in block 704. In one aspect, performing the account login function may include funding a bet associated with the game play, establishing a credit balance to fund the bet associated with the game play, providing and/or changing one or more login credentials of a user, providing player loyalty account information, or a combination thereof. The communication network may include at least one wired and/or wireless communication network through, for example, a Bluetooth™, WIFI, and/or Ethernet connection. The method 700 may end in block 706.

In one aspect, in conjunction with and/or as part of at least one block of FIG. 7, the functionality of the method 700 may include one or more of the following. In one aspect, the method 700 may determine, through the EGM 402, the game application 406 for a current game (being provided or served by) the EGM 402. The method 700 may additionally switch operation of the mobile application 404 to the game application 406 on the EGM 402 subsequent to one or more account login functions being performed. Further, the method 700 may switch operation of the mobile application 404 to the game application 406 on the EGM 402 according to a selected indicator (e.g., the interactive GUI button or selector).

The game application 406 may be automatically and/or manually installed on the mobile device 410 for the game play on the EGM 402 through the mobile device 410. The method 700 may learn, by the game application 406, identity information related to the player or user from the mobile application 404. The identity information may include at least identifying credentials of the user, authentication state data relating to the account login, or a combination thereof.

In an additional aspect, the method 700 may restrict an instance of the game application 406 which lacks an API key from interacting with the mobile application 404, provide to the API key to enable interacting of the game application 406 with the mobile application 404, and/or validate, by the game application 406, information from the mobile application 404 using a cryptographic signature.

As aforementioned, the mobile device 410 may comprise a desktop computer, a portable phone (e.g., a "smartphone"), a media player, a personal data organizer, a handheld game platform, a tablet computer, a notebook or portable computer, or any combination of such devices. Additionally, some or all of the aforementioned functionality may be implemented cross-platform between the mobile device 410 and the EGM 402. In other words, when referring to functionality throughout the present disclosure being performed by "the mobile device 410", this functionality may be equally performed by "the EGM 402" and vice versa.

As will be appreciated by one skilled in the art, aspects of the present disclosure may be embodied as an apparatus, system, method or a computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Aspects of the present disclosure have been described above with reference to flowchart illustrations and/or block diagrams of methods, apparatus, and systems according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function/act specified in the flowcharts and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

The flowcharts and block diagrams in the above figures illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A method for managing mobile applications associated with an electronic gaming machine (EGM), the method comprising:
   receiving, by the EGM over a first communication network, account login information from a first instance of a host application running on a mobile device;
   creating, by the EGM, an account login session using the account login information from the mobile device;
   determining, by a second instance of the host application running on the EGM and during the account login session, that a player has provided valid login credentials via a login screen presented by the mobile device;
   automatically transferring, in response to determining that the player has provided valid login credentials via the login screen presented by the mobile device, the player to an account home screen that enables the player to complete functions associated with a player account of the player;
   identifying a first instance of a game application that is currently being served by the EGM, wherein the first instance of the game application provides a game that is playable by the player on the EGM through one or more input devices at the EGM;

launching, in response to identifying the first instance of the game application a second instance of the game application that enables the player to play the game on the mobile device, wherein, after launching the second instance of the game application on the mobile device, functions of the game available to the player on the EGM are available to the player on the mobile device through the second instance of the game application, wherein the host application and the game application are separate applications that provide different functionality for the player;

receiving, by the second instance of the host application on the EGM, a data request from the second instance of the game application on the mobile device;

fulfilling the data request when the data request provides the second instance of the host application with a key that authorizes interaction between the host application and the game application; and denying the data request when the data request fails to provide the second instance of the host application with the key.

2. The method of claim 1, further comprising:
serving, by the first instance of the game application on the EGM, the second instance of the game application on the mobile device over a second communication network different than the first communication network,
wherein launching the second instance of the game application comprises automatically transferring a display of the mobile device from providing the account home screen to providing the second instance of the game application.

3. The method of claim 1, further comprising, subsequent to creating the account login session, performing one of:
automatically switching, by the mobile device, from the first instance of the host application to the second instance of the game application;
switching operation, on the mobile device, between the second instance of the game application and the first instance of the host application upon the player selecting a selected indicator rendered on a user interface; and
automatically switching, by one of the EGM and the mobile device, to an alternative game application.

4. The method of claim 3, further comprising transmitting, from the second instance of the host application on the EGM to the second instance of the game application on the mobile device, identity information of the player along with player loyalty account information.

5. The method of claim 4, further comprising validating, by the second instance of the game application on the mobile device, exchanged data including the identity information from the first instance of the host application on the mobile device using a cryptographic signature, wherein one of the functions of the host application includes transferring funds to the player account.

6. The method of claim 1, wherein, prior to launching the second instance of the game application on the mobile device, the method comprises the EGM providing the game application to the mobile device to install the game application on the mobile device, wherein the game application is provided to the mobile device from the EGM in response to determining that the mobile device does not have the game application installed thereon after creating the account login session.

7. The method of claim 1, further comprising:
rendering a selector on a display of the mobile device while the player is interacting with the first instance of the host application on the mobile device, wherein the selector notifies the player of an ability to switch from the first instance of the host application on the mobile device to the second instance of the game application on the mobile device;
receiving an indication that the player has selected the selector;
sending, by the first instance of the host application on the mobile device and in response to selection of the selector by the player, information associated with the player to the second instance of the game application;
validating, by the second instance of the game application, the information associated with the player; and
switching, in response to the second instance of the game application validating the information, from the first instance of the host application on the mobile device to the second instance of the game application on the mobile device.

8. The method of claim 1, wherein the first instance of the game application that is currently being served by the EGM is identified subsequent to automatically transferring the player to the account home screen, and wherein the functions associated with the player account of the player that are enabled by the account home screen include at least one of the following:
funding a bet associated with the game, establishing a credit balance to fund the bet associated with the game, receiving one or more login credentials of the player, and providing player loyalty account information.

9. An electronic gaming machine (EGM) comprising:
a display;
a communication module;
a memory device; and
a processor executing instructions stored in the memory device, wherein the instructions, when executed, cause the processor to:
create an account login session using account login information received from a first instance of a host application running on a mobile device and through the communication module;
determine, by a second instance of the host application running on the EGM and during the account login session, that a player has provided valid login credentials via a login screen presented by the mobile device;
automatically transfer, in response to determining that the player has provided valid login credentials via the login screen presented by the mobile device, the player to an account home screen that enables the player to complete functions associated with a player account of the player;
subsequent to automatically transferring the player to the account home screen, receive a query from the mobile device;
provide to the mobile device and in response to the query, an identification of a game most recently served by the EGM, wherein the game most recently served by the EGM is considered a current game that is playable by the player on the EGM through one or more input devices at the EGM;
launch the current game for game play on both the EGM and the mobile device in respective first and second instances of a game application, wherein the host application and the game application are separate applications that provide different functionality for the player, and wherein functions of the current game available to the player on the EGM are available to the player on the mobile device;

receive, by the second instance of the host application on the EGM, a data request from the first instance of the game application on the mobile device;

fulfill the data request when the data request provides the second instance of the host application with a key that authorizes interaction between the host application and the game application; and deny the data request when the data request fails to provide the second instance of the host application with the key.

10. The EGM of claim 9, wherein the query is received via a wireless connection established with a Slot Machine Interface Board (SMIB).

11. The EGM of claim 9, wherein subsequent to creating the account login session, when executed by the processor, the instructions cause the processor to:

automatically switch the game application to an alternative game application.

12. The EGM of claim 9, wherein, prior to launching the current game in the second instance of the game application on the mobile device, the EGM provides the game application to the mobile device to install the game application on the mobile device, and wherein the game application is provided to the mobile device in response to determining that the mobile device does not have the game application installed thereon after creating the account login session.

13. The EGM of claim 9, wherein when executed by the processor, the instructions cause the processor to send a transmission, from the second instance of the host application on the EGM to the second instance of the game application on the mobile device, that includes identity information of the player along with player loyalty account information.

14. The EGM of claim 13, wherein the transmission includes a cryptographic signature for validation by the second instance of the game application on the mobile device.

15. The EGM of claim 13, wherein the game most recently served by the EGM is identified subsequent to automatically transferring the player to the account home screen, and wherein the functions associated with the player account of the player that are enabled by the account home screen include at least one of the following:

funding a bet associated with the game play, establishing a credit balance to fund the bet associated with the game play, receiving one or more login credentials of the player, and providing player loyalty account information.

16. The EGM of claim 9, wherein
the key comprises an application programming interface (API) key.

17. A system for managing mobile applications associated with an electronic gaming machine (EGM), the system comprising:

a mobile device; and the EGM, the EGM including a processor executing instructions stored in a memory device, wherein the instructions, when executed, cause the processor to:

create an account login session using account login information received from a first instance of a host application running on the mobile device and through a first wireless communication link over a first communication network established between the mobile device and the EGM;

determine, by a second instance of the host application running on the EGM and during the account login session, that a player has provided valid login credentials via a login screen presented by the mobile device;

automatically transfer, in response to determining that the player has provided valid login credentials via the login screen presented by the mobile device, the player to an account home screen that enables the player to complete functions associated with a player account of the player;

in response to the creating the account login session, identify a first instance of a game application being served by the EGM, wherein the first instance of the game application provides a game that is playable by the player on the EGM through one or more input devices at the EGM;

in response to identifying the first instance of the game application being served by the EGM, asynchronously notify the mobile device to cause the mobile device to launch a second instance of the game application for playing the game on the mobile device, wherein functions of the game that are available to the player on the EGM are available to the player on the mobile device, wherein the host application and the game application are separate applications that provide different functionality for the player;

serve, by the first instance of the game application on the EGM, the second instance of the game application on the mobile device through a second wireless communication link over a second communication network different than the first communication network;

receive, by the second instance of the host application on the EGM, a data request from the first instance of the game application on the mobile device;

fulfill the data request when the data request provides the second instance of the host application with a key that authorizes interaction between the host application and the game application; and deny the data request when the data request fails to provide the second instance of the host application with the key, wherein when executed by the processor, the instructions cause the processor to provide, in response to determining that the mobile device does not have the game application installed thereon, the game application to the mobile device to install the game application on the mobile device.

18. The system of claim 17, wherein the data request comprises a request for information associated with the player, and wherein the game application is wirelessly provided to the mobile device by a Slot Machine Interface Board (SAM) of the EGM.

19. The system of claim 18, wherein when executed by the processor, the instructions cause the processor to wirelessly transmit, from the first instance of the host application on the EGM to the second instance of the game application on the mobile device, identity information of the player along with player loyalty account information.

20. The system of claim 19, wherein the key comprises an application programming interface (API) key, and wherein the host application and the game application are programmed by different parties.

* * * * *